Patented Sept. 15, 1925.

1,553,881

UNITED STATES PATENT OFFICE.

HEINRICH SIEGEL, OF BERLIN, GERMANY, AND ERICH PÖDDER, OF REVAL, ESTHONIA.

COMPOSITION FOR REMOVING RUST FROM AND CLEANSING STEEL AND IRON.

No Drawing.      Application filed March 11, 1924. Serial No. 698,532.

*To all whom it may concern:*

Be it known that I, HEINRICH SIEGEL, a subject of the German Republic, residing at Berlin, Germany, and I, ERICH PÖDDER, a subject of the Esthonian Republic, residing at Reval, Esthonia, have invented certain new and useful Improvements in Compositions for Removing Rust from and Cleansing Steel and Iron, of which the following is a specification.

Petroleum and benzene have been used heretofore, either individually or as a mixture, for removing rust from, and cleansing, steel and iron parts of machines, motors, automobiles, tools and the like. The present high price of these agents, however, practically prohibits their use. In addition to these, so-called chemical rust-removing agents are also known which, however, apart even from their high price, have the objectionable property that they adhere firmly to the skin of the operator. For this reason the hands, when working with these known chemical rust-removers, must be protected by leather gloves. Also the storage of the known rust-removers and cleaners requires particular precautionary measures as they easily eat through and destroy the usual containers and vessels. Rust removal and cleansing by the employment of heavy oils is also known.

The present invention relates to the manufacture of rust-removing agents which, with a slight alteration in their composition, may be used equally well as cleansers. The constituents used in carrying out the manufacture are cheaper than those heretofore used and do not affect the operator, neither do they affect the article being treated more than is absolutely necessary for the removal of the rust and dirt. It is to be particularly noted that the storage and employment of the material, which is also fireproof, is simple and convenient by reason of its crystalline condition.

The rust remover, as made under this invention, consists of a mixture of caustic soda, hydrated sodium carbonate and potassium manganate or potassium permanganate. The chemicals are mixed together and kept in a dry state until required for use when they are mixed with water whereupon a chemical reaction is set up which produces a liquid capable of easily and quickly removing rust.

The following proportions, which have been found in practice to be very effective for removing rust, are given by way of example:—750 gms. caustic soda, 875 gms. hydrated sodium carbonate, 10 gms. potassium manganate or potassium permanganate, 12 litres water.

Small articles from which rust is to be removed, are dipped into the solution and after several minutes soaking are rubbed over with a rag. Larger articles are brushed over with the solution, i. e. they are covered with a film or layer of the solution and are then, after some minutes soaking, rubbed over with a rag in the same manner.

If it is desired to cleanse whole machines, machine parts or other steel or iron articles, from dirt, oil, colours, or smoke, the composition of the solution is altered slightly by the addition of a small proportion of glycerine which may be introduced into the liquid but is preferably added to the dry crystals. The rust-removing properties of the mixture remain unchanged even with this addition.

For cleansing, that is, when the removal of rust is less essential than the cleansing itself, the following proportions, which are given by way of example, are found to be effective in practice:—¼ kg. caustic soda, 4 kg. hydrated sodium carbonate, ⅛ kg. glycerine, 16 gms. potassium manganate or potassium permanganate, 120 litres water.

The glycerine on account of its relatively small quantity, is absorbed by the other crystalline materials and is not particularly noticeable when the composition is dissolved in hot water. The cleansing composition dissolves easily in warm or hot water which may be added, as indicated by the foregoing example, in large quantities, the articles to be cleansed being dipped into or washed in the solution.

Although definite proportions of water are given above, the powerful combination of crystals may be dissolved to any desired amount in warm water, the article to be operated on being brushed over with, or dipped into the solution. After a few minutes, the rust present is loosened without any injury whatsoever to the underlying skin or surface of the iron or steel body. The article is then simply mopped with a rag and, in consequence, retains a thin protecting film of the liquid which ensures protection against renewal of the rust for several weeks.

Both the above mentioned compositions are absolutely harmless to the operator and to the article being cleansed; they are convenient to store in dry form, are cheaper to manufacture than the heretofore known rust-removing and cleansing agents; and it has been found that they are far superior in effect.

Having now fully described our invention what we claim and desire to secure by Letters Patent is:—

1. A composition for removing rust from, and also cleansing steel and iron consisting of caustic soda, hydrated sodium carbonate, potassium manganate and water, with the addition of glycerine.

2. A composition for removing rust from and also cleansing steel and iron consisting of the following ingredients in substantially the proportions named: ¼ kg. caustic soda, 4 kg. hydrated sodium carbonate, ⅛ kg. glycerine, 16 gms. potassium manganate, 120 litres of water.

In testimony whereof we have affixed our signatures.

HEINRICH SIEGEL.
ERICH PÖDDER.